(12) United States Patent
Georgi et al.

(10) Patent No.: US 10,767,988 B2
(45) Date of Patent: Sep. 8, 2020

(54) METHOD AND DEVICE FOR DETERMINING ACTUAL DIMENSIONAL PROPERTIES OF A MEASURED OBJECT

(71) Applicant: CARL ZEISS INDUSTRIELLE MESSTECHNIK GMBH, Oberkochen (DE)

(72) Inventors: Bernd Georgi, Oberkochen (DE); Josef Wanner, Oberkochen (DE); Roland Froewis, Oberkochen (DE); Hubert Lettenbauer, Essingen (DE)

(73) Assignee: CARL ZEISS INDUSTRIELLE MESSTECHNIK GMBH, Oberkochen (DE)

(*) Notice: Subject to any disclaimer, the term of this patent is extended or adjusted under 35 U.S.C. 154(b) by 223 days.

(21) Appl. No.: 15/788,045

(22) Filed: Oct. 19, 2017

(65) Prior Publication Data
US 2018/0045511 A1 Feb. 15, 2018

Related U.S. Application Data

(63) Continuation of application No. PCT/EP2015/058607, filed on Apr. 21, 2015.

(51) Int. Cl.
G01B 21/04 (2006.01)
(52) U.S. Cl.
CPC .................. G01B 21/04 (2013.01)
(58) Field of Classification Search
CPC ....................................................... G01B 21/04
See application file for complete search history.

(56) References Cited

U.S. PATENT DOCUMENTS

| 9,683,828 | B2 | 6/2017 | Pettersson et al. |
| 2002/0032541 | A1* | 3/2002 | Raab ............ G01B 21/047 702/152 |

(Continued)

FOREIGN PATENT DOCUMENTS

| DE | 296 03 273 U1 | 4/1996 |
| DE | 296 03 273 U1 | 5/1996 |

(Continued)

OTHER PUBLICATIONS

Phillips et al., Measurement Uncertainty Considerations for Coordinate Measuring Machines, NIST, 1993 (Year: 1993).*

(Continued)

*Primary Examiner* — Kyle R Quigley
(74) *Attorney, Agent, or Firm* — Harness, Dickey & Pierce, P.L.C.

(57) ABSTRACT

A CMM has a measuring head for recording measurement values associated with an object having a plurality of geometric elements. Defined geometric elements are selected from the plurality of geometric elements and test features relating to the defined geometric elements are determined depending on demand data provided for the geometric elements. Initially, a first measurement sequence including first control commands for controlling the measuring head are determined depending on the test features. The first measurement sequence is modified before the individual measurement values are recorded in order to obtain a second measurement sequence with second control commands, which differ from the first control commands. The second control commands are used for controlling the measuring head and are selected so that the measurement results at the selected geometric elements each have a defined measurement uncertainty that is smaller, by a (Continued)

defined absolute value, than acceptable manufacturing tolerances for the geometric elements.

17 Claims, 4 Drawing Sheets

(56) References Cited

U.S. PATENT DOCUMENTS

| | | | |
|---|---|---|---|
| 2009/0306990 A1* | 12/2009 | Vandervoort | G01B 5/008 704/275 |
| 2011/0264402 A1 | 10/2011 | Anderson et al. | |
| 2013/0118020 A1* | 5/2013 | Briggs | G01B 5/012 33/503 |
| 2014/0152805 A1 | 6/2014 | Saeki et al. | |
| 2014/0222373 A1* | 8/2014 | Sprenger | G01B 21/045 702/155 |

FOREIGN PATENT DOCUMENTS

| | | |
|---|---|---|
| DE | 195 29 547 A1 | 2/1997 |
| DE | 10 2011 000 088 A1 | 7/2011 |
| DE | 10 2013 101 931 A1 | 8/2014 |
| EP | 2 735 843 A1 | 5/2014 |
| EP | 2 738 515 A1 | 6/2014 |
| WO | WO 02/023292 A3 | 3/2002 |

OTHER PUBLICATIONS

NDT Resource Center, Uncertainty Terminology, Sep. 14, 2014 (Year: 2014).*
Michael Trenk et al.; The "Virtual CMM" a software tool for uncertainty evaluation—practical application in an accredited calibration lab; prior to Apr. 21, 2015; 6 pp.
P. Wocke; KMG automatisch programmieren; 1994; pp. 181-186.
Carl Zeiss Brochure; Einfach Messen Und was Sie dazu wissen sollten; Apr. 1999; 120 pp.
Carl Zeiss advertisement brochure; Calypso Einfach programmieren; 2004; 16 pp.
English translation of International Preliminary Report on Patentability (Chapter II) for PCT/EP2015/058607; 10 pp.
International Search Report for PCT/EP2015/058607; dated Jan. 13, 2016; 13 pp.

\* cited by examiner

METHOD AND DEVICE FOR DETERMINING ACTUAL DIMENSIONAL PROPERTIES OF A MEASURED OBJECT

CROSS-REFERENCES TO RELATED APPLICATIONS

This application is a continuation of international patent application PCT/EP2015/058607 filed on Apr. 21, 2015 designating the U.S. The entire content of this prior application is incorporated herein by reference.

BACKGROUND OF THE INVENTION

The present invention relates to a method and a device for determining actual dimensional properties of a measured object having a plurality of geometric elements.

EP 2 738 515 A1 discloses a typical example of such a device in the form of a coordinate measuring machine. The known coordinate measuring machine has a workpiece receptacle and a CCD camera, which is movable in three orthogonal spatial directions relative to the workpiece receptacle. The CCD camera is part of a measuring head that can be used to determine the position of selected measurement points on a measured object relative to a reference coordinate system. Usually, such a device is used to determine measurement point coordinates for a plurality of measurement points on a measured object. On the basis of said measurement point coordinates, it is then possible to determine actual dimensional properties of the measured object, such as, for instance, the diameter of a bore or the distance between two edges on the measured object.

In principle, it is possible to manually control the movements of the measuring head relative to the measured object and the recording of the measurement values. However, an automated measurement sequence is desirable in the quality control of industrially produced products, such that a plurality of measured objects of identical type can be measured as rapidly and reproducibly as possible. Generating an automated measurement sequence requires fundamental knowledge of the operation of coordinate measuring machines and experience of how different geometric elements on a measured object can best be measured. Furthermore, an optimum measurement sequence may vary depending on what kind of measuring head and/or what movement axes are available on a coordinate measuring machine. In this regard, a measuring head having a non-contact sensor, as in the case of the coordinate measuring machine from EP 2 738 515 A1, for instance, may require a different measurement sequence than, for example, a tactile measuring head, i.e. a measuring head having a probe element configured to touch selected measurement points on the measured object.

EP 2 738 515 A1 proposes to use a wide-angle monitoring camera in addition to the CCD camera on the measuring head. The wide-angle monitoring camera is configured to record an image of the entire measured object from a bird's eye perspective. This (further) image is shown on the display of an operator terminal in order to make it easier for the operator to generate an automated measurement sequence taking into account and avoiding possible collisions between measuring head and measured object. Beyond that, the device from EP 2 738 515 A1 does not, however, offer more extensive support in the generation of a measurement sequence and the operator thus requires profound knowledge and experience in order to generate an optimum measurement sequence for a specific measured object.

Under the brand name CALYPSO, Carl Zeiss Industrielle Messtechnik GmbH offers software for generating an automatic measurement sequence and for processing the measurement results obtained. The basic principles of CALYPSO are described for example in a brochure entitled "Einfach Messen and was Sie dazu wissen sollten—Eine Fibel der Messtechnik" ["Straightforward measurement and what you should know to implement it—Primer for metrology"] (order number from Carl Zeiss: 61212-2400101) or in an advertisement brochure from Carl Zeiss Industrielle Messtechnik GmbH entitled "Calypso. Einfach programmieren" ["Calypso. Simple programming"] (publication number 60-11-068). The measurement sequence is generated by CALYPSO on the basis of so-called test features. A test feature represents an actual dimensional property of one or more geometric elements (so-called measurement elements) on a measured object, such as e.g. the diameter of a bore, the roundness of a cylinder section or the relative distance between two such geometric elements. As a rule, a plurality of measurement points on one or more geometric elements need to be captured in order to quantify a test feature. With the selection of a test feature, CALYPSO generates control commands that can be used to automatically control the measuring head for measuring the required measurement points. By means of the orientation to test features, CALYPSO makes it easier for an operator to generate the measurement sequence because the test features generally correspond to indications which the operator can infer from a technical drawing of the measured object.

For the purposes of generating the automated measurement sequence, the user must define and configure the desired test features one after the other using CAD data and, in this context, select various parameters including parameters for the machine movements. To this end, CALYPSO offers default values in each case, said default values having proven their worth for a large number of measurement problems, but an experienced user can modify the default values in order to optimize the automated measurement sequence in relation to a specific measurement problem.

Modifying a parameter in the course of configuring the measurement value recording for a first test feature may however affect the measurement accuracy and/or measurement speed for recording measurement values of another test feature since, for example, machine vibrations and/or approach paths may vary depending on the movement parameters for the first test feature. The generation of an ideal measurement sequence for a plurality of test features is therefore very time-consuming and requires significant specialist knowledge and experience on part of the user.

Completely independently of the problems and difficulties associated with generating a measurement sequence, there is a software tool, designated "Virtual CMM", which was developed under the lead management of the Physikalisch-Technische Bundesanstalt (PTB), the national German metrology institute, for determining measurement uncertainty of a measurement with a coordinate measuring machine on the basis of statistical methods. By way of example, an overview of the Virtual CMM software tool is found, for example, in the publication "The 'Virtual CMM' a software tool for uncertainty evaluation—practical application in an accredited calibration lab" by Feinmess GmbH & Co. KG and the PTB.

SUMMARY OF THE INVENTION

Against this background, it is an object of the present invention to provide a method and a device of the type mentioned at the outset which allow to simply and rapidly determine actual dimensional properties of a measured object, in particular a standard part from industrial production, with an increased efficiency, accuracy and/or comparability to other measurements of a measured object of the same type.

In accordance with a first aspect of the invention, there is provided a method for determining actual dimensional properties of a measured object having a plurality of geometric elements, said method comprising the steps of providing a coordinate measuring machine having a measuring head for recording measurement values representing a position of at least one measurement point on the measured object, providing demand data representing demand properties for the plurality of geometric elements of the measured object, wherein the demand properties comprise acceptable manufacturing tolerances for the geometric elements, generating, in a computer-assisted manner, a measurement sequence which defines movements of the measuring head relative to the measured object and which defines measurement values to be recorded at defined measuring head positions relative to the measured object, wherein defined geometric elements are selected from the plurality of geometric elements and test features relating to the defined geometric elements are determined depending on the demand data, and wherein control commands for controlling the measuring head relative to the defined geometric elements are determined depending on the test features, recording individual measurement values on the measured object with the aid of the measuring head, wherein the measuring head is controlled depending on the control commands, and determining numerical values depending on the individual measurement values, wherein the numerical values represent actual dimensional properties of the measured object which correspond to the test features, wherein a first measurement sequence is initially generated in a computer-assisted manner, said first measurement sequence defining first control commands, and wherein the first measurement sequence is modified in a computer-assisted manner before the individual measurement values are recorded in order to obtain a second measurement sequence with second control commands, wherein the second control commands at least partially differ from the first control commands, wherein the measuring head for recording the individual measurement values is controlled depending on the second control commands, wherein the second control commands are selected, in a computer-assisted manner, in such a way that the numerical values each have a defined measurement uncertainty which is smaller by a defined absolute value than the acceptable manufacturing tolerances for the geometric elements, wherein the defined measurement uncertainty is ascertained depending on the first control commands, wherein the first measurement sequence is modified depending on the ascertained measurement uncertainty, and wherein the second control commands are selected in such a way that the defined measurement uncertainty is increased for at least one of the test features while the defined measurement uncertainty for at least one other test feature is maintained or reduced.

In accordance with another aspect of the invention, there is provided a method of the type mentioned at the outset, comprising the steps of providing a coordinate measuring machine having a measuring head for recording measurement values representing a position of at least one measurement point on the measured object, providing demand data representing demand properties for the plurality of geometric elements of the measured object, wherein the demand properties comprise acceptable manufacturing tolerances for the geometric elements, generating, in a computer-assisted manner, a measurement sequence which defines movements of the measuring head relative to the measured object and which defines measurement values to be recorded at defined measuring head positions relative to the measured object, wherein defined geometric elements are selected from the plurality of geometric elements and test features relating to the defined geometric elements are determined depending on the demand data, and wherein control commands for controlling the measuring head relative to the defined geometric elements are determined depending on the test features, recording individual measurement values on the measured object with the aid of the measuring head, wherein the measuring head is controlled depending on the control commands, and determining numerical values depending on the individual measurement values, wherein the numerical values represent actual dimensional properties of the measured object which correspond to the test features, wherein a first measurement sequence is initially generated, said first measurement sequence defining first control commands, and in that the first measurement sequence is modified before the individual measurement values are recorded in order to obtain a second measurement sequence with second control commands, wherein the second control commands at least partially differ from the first control commands, wherein the measuring head for recording the individual measurement values is controlled depending on the second control commands, and wherein the second control commands are selected in such a way that the numerical values each have a defined measurement uncertainty that is smaller by a defined absolute value than the acceptable manufacturing tolerances for the geometric elements.

According to yet another aspect of the invention, there is provided a device for determining actual dimensional properties of a measured object having a plurality of geometric elements, said device comprising a workpiece receptacle for holding the measured object, comprising a measuring head that is displaceable relative to the workpiece receptacle and configured to record measurement values that represent a position of at least one measurement point on the measured object, comprising an evaluation and control unit that displaces the measuring head relative to the workpiece receptacle depending on a defined measurement sequence, and comprising an interface for supplying demand data that represent demand properties for the plurality of geometric elements of the measured object, wherein the demand properties comprise acceptable manufacturing tolerances for the geometric elements, wherein the evaluation and control unit is configured to facilitate a computer-assisted generation of a measurement sequence which defines movements of the measuring head relative to the measured object and defines measurement values to be recorded at defined measuring head positions relative to the measured object, wherein defined geometric elements can be selected from the plurality of geometric elements and test features relating to the defined geometric elements can be determined depending on the demand data, and wherein control commands for controlling the measuring head relative to the defined geometric elements can be determined depending on the test features, wherein the evaluation and control unit is further configured to control the measuring head depending on the control commands in order to record individual measurement values on the measured object and to determine first numerical values depending on the individual measurement values, wherein the first numerical values represent actual dimensional properties of the measured object, which actual dimensional properties correspond to the test features, wherein the evaluation and control unit is further configured to initially generate a first measurement sequence, which defines first control commands for controlling the measuring head relative to the measured object, and to modify the first measurement sequence before recording the individual measurement values in order to obtain a second measurement sequence with second control commands, wherein the second control commands at least partly differ from the first control commands, wherein the evaluation and control unit is configured to control the measuring head for recording the individual measurement values depending on the second control commands, wherein the second control commands are selected in such a way that the numerical values each have a defined measurement uncertainty that is smaller by a defined absolute value than the acceptable manufacturing tolerances for the geometric elements, wherein the evaluation and control unit is configured to ascertain the defined measurement uncertainty depending on the first control commands and to modify the first measurement sequence depending on the ascertained measurement uncertainty, wherein the second control commands are selected in a computer-assisted manner in such a way that the defined measurement uncertainty for at least one of the test features is increased while the defined measurement uncertainty for at least one other test feature is maintained or reduced.

It is particularly advantageous if the methods and the device are implemented with the aid of a computer program comprising program code configured to perform the aforementioned methods when the program code is executed on an evaluation and control unit of a coordinate measuring machine.

The novel methods and the novel device for the first time use the measurement uncertainty of a measurement as a criterion for optimizing a measurement sequence for an automated measurement of a measured object. Accordingly, a first, largely provisional measurement sequence is initially generated and modified in a second step while taking into account the expected measurement uncertainty until a criterion that relates to the measurement uncertainty is satisfied. Only the modified measurement sequence is used for recording the individual measurement values. Preferably, the second control commands of the modified measurement sequence are selected in such a way that an individual defined measurement uncertainty is obtained for each test feature, said defined measurement uncertainty being smaller by a defined absolute value than the acceptable manufacturing tolerances of precisely those geometry features that relate to the respective test feature. In other words, the optimization criterion in preferred exemplary embodiments relates individually to each selected test feature and/or geometric element.

Since at least some control commands in the modified second measurement sequence differ from the corresponding control commands in the first measurement sequence, the individual measurement values are recorded with movements of the measuring head (relative to the measured object) that are different to what was originally configured on the basis of the first control commands. By way of example, the measuring head may be moved quicker or slower in a certain section of the measurement sequence than was provided for with the first control commands. Alternatively, or additionally, the measuring head may be moved along a modified trajectory, a larger or smaller number of measurement points may be measured, and/or a modified measuring head, for example a different stylus combination, may be used within the scope of the modified second measurement sequence.

The modification and associated optimization of the measurement sequence is effectuated not only on the basis of individual knowledge and experience of the user, but in a systematic manner on the basis of an objective and is quantifiable criterion, namely the respectively achievable measurement uncertainty, which changes on account of the modified configuration of the measurement sequence. By way of example, it can easily be seen that the measurement uncertainty in the case of very fast movements of the measuring head relative to the measured object will typically be greater than in the case of very slow movements. On the other hand, very slow movements of the measuring head are to the detriment of the throughput and the efficiency. The use of different stylus combinations can likewise have an effect on the measurement uncertainty, for example because a long and thin stylus facilitates more precise probing of delicate structures but it is less stable and more sensitive to vibrations than a short thick stylus. As a consequence, the change to a different or modified probing system may be expedient, even though such a change takes time. The change from one sensor principle to another one, i.e., for example, a change from a tactile sensor to a contactless sensor, also has effects on the achievable measurement uncertainty, and may or may not be expedient, depending on the specific measurement problem.

The novel method and the corresponding device use the achievable measurement uncertainty as an objective optimization criterion, which is largely independent of personal experience of a user, by virtue of the first measurement sequence being modified in a systematic manner such that a defined measurement uncertainty is obtained in relation to the acceptable manufacturing tolerances for the geometric elements. In preferred exemplary embodiments, the evaluation and control unit is configured to allow the user to specify the defined measurement uncertainty, in particular in the form of a percentage rate in relation to the manufacturing tolerances for the geometric elements. By way of example, the defined measurement uncertainty may be 20% of the acceptable manufacturing tolerances and the first measurement sequence, which is generated with default values, is modified in the second step such that the predetermined measurement uncertainty is achieved for individual selected measurement elements and/or test features, or even for the entire measurement process. Preferably, the defined measurement uncertainty lies in the order of between 10% and 50% of the acceptable manufacturing tolerances, preferably not higher than 25% and particularly preferably at approximately 20% of the acceptable manufacturing tolerances. Moreover, it is preferable if the defined measurement uncertainty as optimization criterion varies depending on the selected measurement elements and/or test features. By way of example, the defined measurement uncertainty, as a desired value for a first measurement element, may thus be 20% of the acceptable manufacturing tolerance for this measurement element, while the defined measurement uncertainty for another (second) measurement element may be 30% of the acceptable manufacturing tolerance.

In some exemplary embodiments, the first measurement sequence can be modified using the trial and error method, wherein the respectively achievable measurement uncertainty is ascertained and wherein the first measurement sequence is iteratively modified until the desired defined measurement uncertainty is reached. In some preferred exemplary embodiments, the user is assisted by the evaluation and control unit by virtue of the evaluation and control unit being configured to display modification suggestions which are respectively oriented toward an increase or a reduction in the measurement uncertainty. By way of example, it may be suggested to the user to reduce the movement speed of the measuring head relative to the measured object at a specific point of the measurement sequence, or a different probe combination within the scope of modifying the first measurement sequence. In principle, an automatic modification of the first measurement sequence on the basis of an analysis of the defined measurement uncertainty for a plurality of possible parameter combinations is also conceivable.

The novel method and the corresponding device simplify the generation of an optimized measurement sequence on the basis of an objective target criterion. As a consequence, even less experienced users can generate an optimized measurement sequence for a specific measurement. Likewise, an experienced user can arrive at an optimized measurement sequence in a quicker and more systematic manner. Depending on the acceptable manufacturing tolerances for the measured object, the second control commands facilitate a faster measurement with sufficient measurement accuracy or a higher measurement accuracy and/or better comparability of the measurement results. The aforementioned object is therefore achieved completely.

In a preferred refinement of the invention, the defined measurement uncertainty is ascertained (preferably computationally as a numerical value) depending on the first control commands, wherein the first measurement sequence is modified depending on the ascertained measurement accuracy. Preferably, the defined measurement uncertainty is ascertained with the aid of the Virtual CMM software tool, which was already referred to further above. In general, it is preferred if the defined measurement uncertainty is ascertained with the aid of statistical simulations, for example using the methods of a Monte Carlo simulation.

In this refinement, the defined measurement uncertainty is ascertained with the aid of statistical methods, wherein the first measurement sequence with the first control commands forms the basis for determining the measurement uncertainty. Subsequently, the first measurement sequence is modified and the defined measurement uncertainty is ascertained anew on the basis of the modified measurement sequence. Advantageously, this method is carried out iteratively until the defined measurement uncertainty reaches the target value underlying the optimization. The refinement is advantageous in that the optimization is effectuated on the basis of a quantifiable and reproducible target variable and on the basis of a defined starting point, namely the first control commands, this facilitating a particularly good comparability of the respective measurement results.

In a further refinement, the second control commands are therefore determined on the basis of a plurality of iteration steps.

This refinement facilitates a "systematic approach" to an ideal measurement sequence and can be realized comparatively easily for a plurality of different coordinate measuring machine types.

In a further refinement, the second control commands are selected in such a way that the defined measurement uncertainty is increased for at least one of the test features.

This refinement appears quite unusual since an increased measurement uncertainty is accompanied by a lower measurement accuracy. However, increasing the measurement uncertainty for individual test features facilitates an increase in the efficiency and in the throughput. Therefore, the second control commands are selected in preferred exemplary embodiments in such a way that the defined measurement uncertainty is increased for at least one of the test features while the defined measurement uncertainty is maintained or even reduced for at least one other test feature. Accordingly, the second control commands are selected in the preferred exemplary embodiments in such a way that the defined measurement uncertainty is different for different test features and increased for at least one of these test features within the scope of modifying the measurement sequence. In this way, a modified second measurement sequence is obtained, said second measurement sequence realizing different defined measurement uncertainties for different test features on the measured object. As a consequence, a high measurement accuracy and a high measurement speed can be combined with one another in a particularly advantageous manner.

In a further refinement, the second control commands are determined after the first measurement sequence was fully completed. As an alternative to this, however, it is conceivable, in principle, to even modify the first measurement sequence before it is fully completed, i.e., as it were "on the fly". The present refinement is advantageous thereover in that the optimization captures the entire first measurement sequence and, as a consequence, allows cross-references and dependencies over the entire measurement sequence to be taken into account for the optimization.

In a further refinement, the first control commands and second control commands each define movement parameters of the measuring head relative to the measured object. Advantageously, the movement parameters are changed during the modification of the first measurement sequence in such a way that the second control commands, in comparison with the first measurement sequence, lead to a modified movement sequence of the measuring head relative to the measured object. In particular, it is advantageous if the second control commands define modified movement speeds and/or movement accelerations of the measuring head relative to the measured object when compared to the first measurement sequence.

This refinement facilitates a very systematic optimization of the measurement sequence in relation to the contradictory demands for a high measurement accuracy and a high measurement speed. By modifying the respective movement parameters, it is possible to quite quickly obtain an ideal compromise between the contradictory demands. In accordance with the aforementioned aspect of the novel method and of the device, the modifications to the movement parameters, however, are not carried out purely intuitively but in a systematic manner in view of achieving a defined measurement uncertainty.

In a further refinement, a first database is provided, in which machine properties of the coordinate measuring machine are stored, wherein the second control commands, in particular a movement speed of the measuring head relative to the measured object defined by the second control commands, are determined depending on the machine properties.

In this refinement, the individual machine properties of the coordinate measuring machine are advantageously taken into account when optimizing the measurement sequence. In some exemplary embodiments, the machine properties are restricted to those that are characteristic for the respective type of the employed coordinate measuring machine, i.e., for example, for a portal-type coordinate measuring machine in contrast with a coordinate measuring machine with a column/stand construction. In preferred exemplary embodiments, the machine properties moreover contain individual properties of the respective coordinate measuring machine, i.e., for example, the respective calibration data.

Taking into account the machine properties leads to an even more efficient second measurement sequence since, for example, the vibration behavior of a horizontal-arm-type coordinate measuring machine is different to the vibration behavior of a portal-type coordinate measuring machine. Accordingly, the measurement uncertainties which are achievable by the respective machine types in the case of otherwise comparable surrounding conditions also differ. Since the measurement uncertainty is used as a target variable for the optimization according to the novel method and the corresponding device, taking into account the machine properties leads to particularly good results.

In a further refinement, a second database is provided, in which further numerical values which represent actual dimensional properties of a reference measured object are stored, wherein the second control commands are determined depending on the further numerical values.

In some variants of this refinement, the reference measured object is a measured object of the same type which was measured in a reference coordinate measuring machine with a particularly high accuracy, for example under laboratory conditions with a defined measurement room temperature. In other variants, the reference measured object can be a measured object of the same type which was measured in a coordinate measuring machine of a different type, for example using a different sensor. Taking into account these reference measurement results when modifying the first measurement sequence leads to a second measurement sequence that is optimized with respect to the comparability. The refinement is particularly advantageous in view of feeding the measurement results back to a certified reference standard.

In a further refinement, the measuring head for recording the measurement values is equipped with a defined sensor arrangement which is determined depending on the defined measurement uncertainty.

In this refinement, the modification of the first measurement sequence comprises a modification of the measuring head and, in particular, a modification of the respectively used sensor arrangement. In other words, this refinement comprises selecting the sensor arrangement that is used within the scope of the second measurement sequence depending on the respectively achievable measurement uncertainty as a target variable. The refinement is advantageous in that very large changes in relation to the measurement uncertainty can be obtained by varying the sensor arrangement, which is why this refinement facilitates a very fast optimization. Secondly, this refinement profits from the advantages of the novel method and the device since a quantifiable target variable for modifying the sensor arrangement is provided by way of the defined measurement uncertainty. It is particularly advantageous if, within the scope of this refinement, a probe arrangement that is optimized in relation to the measurement uncertainty is selected for a tactile sensor in a systematic manner.

In a further refinement which is also an advantageous improvement of the prior art on its own (i.e. without considering the measurement uncertainty), the second control commands are further selected in such a way that the second measurement sequence causes a defined measurement time. Preferably, a first measurement time is selected on the basis of the first control commands, in particular in a computer-based simulation, and a difference between the first measurement time and a defined target time is determined. Then, the second control commands are selected in such a way that this difference is minimal.

In the case of measurements in a manufacturing environment, the measurement time, i.e. the time required for recording the measurement values, plays an important role in addition to the measurement accuracy. Accordingly, generating the measurement sequence taking into account a defined measurement time as an objective target criterion leads to even further optimized results. There is a performance optimization in view of target time and demanded accuracy.

In a further refinement, the second control commands are further selected depending on an individual user approval.

In this refinement, the modifications of the first measurement sequence are dependent on a respective approval by the user who generates the first measurement sequence and modified second measurement sequence. As a consequence, the refinement comprises an interactive optimization. The modifications are easily comprehensible by the respective user, which is particularly advantageous for a good comparability of the measurement results with other measurement results from measured objects of the same type.

In a further refinement, the first measurement sequence and/or second measurement sequence are generated with the aid of speech input.

In this refinement, the novel device and the novel method use a speech recognition software tool. The refinement facilitates very convenient and quick editing and modifying of a generated measurement sequence, in particular in combination with an individual user approval.

It goes without saying that the aforementioned features and those yet to be explained below can be used not only in the combination specified in each case but also in other combinations or on their own, without departing from the scope of the present invention.

BRIEF DESCRIPTION OF THE DRAWINGS

Exemplary embodiments of the invention are illustrated in the drawings and will be explained in greater detail in the following description. In the drawings.

BRIEF DESCRIPTION OF THE PREFERRED EMBODIMENTS

Figure 1:
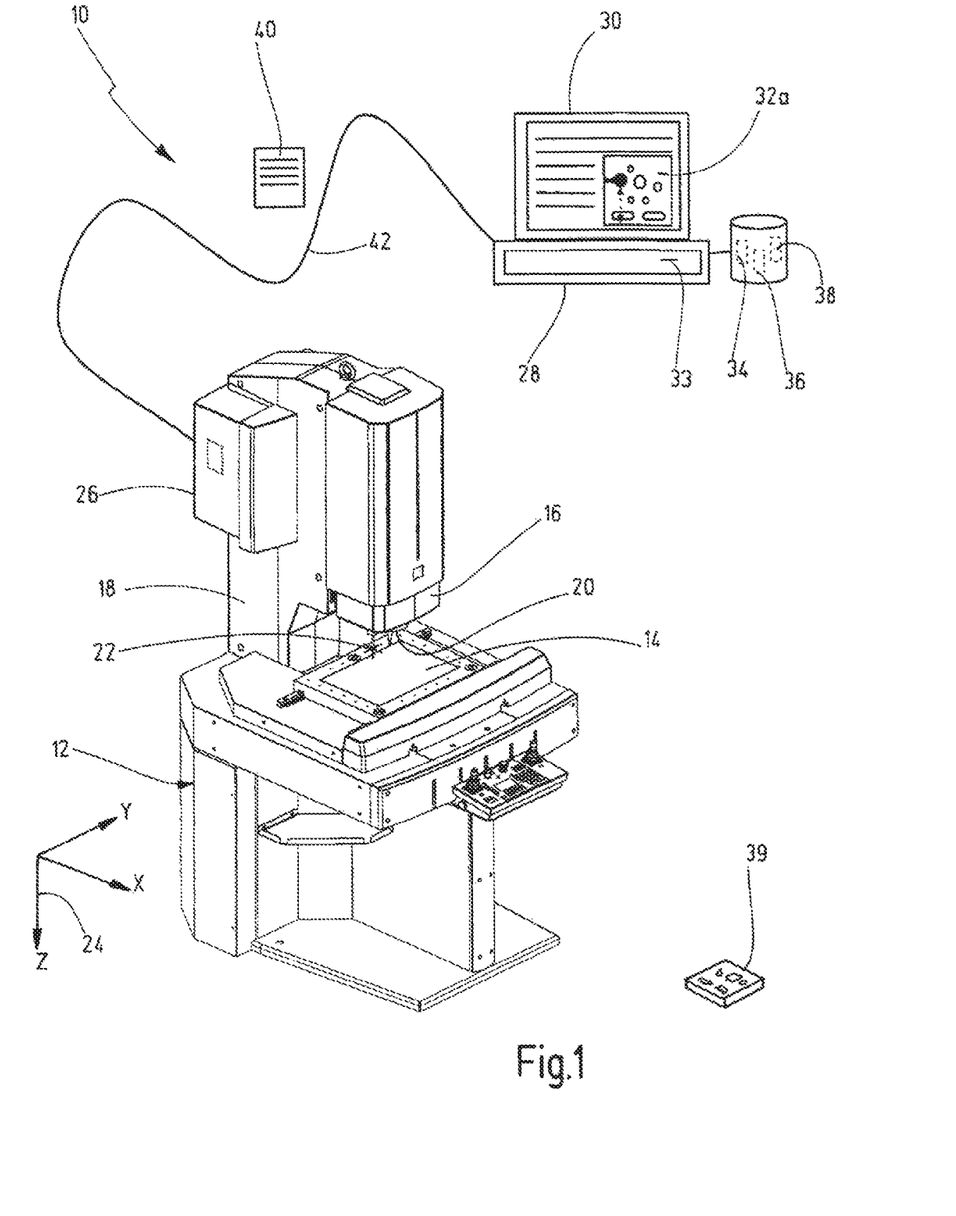
FIG. 1 shows an exemplary embodiment of the novel device, which can be used to perform the novel method.

In FIG. 1, a device which operates according to the novel method is designated in its entirety by reference numeral 10.

The device 10 comprises a coordinate measuring machine 12 having a workpiece receptacle 14 (here in the form of an x-y compound table) and a measuring head 16. The measuring head 16 is arranged on a column 18 and can be moved here relative to the workpiece receptacle 14 in a vertical direction along the column 18. This axis of movement is usually referred to as the z-axis. The workpiece receptacle 14 can be moved relative to the measuring head 16 in two orthogonal directions, which are usually referred to as x- and y-axes. Overall, the measuring head 16 here can thus be moved in three orthogonal spatial directions relative to the workpiece receptacle 14 in order to carry out a measurement on a measured object (not illustrated here). The three orthogonal spatial directions x, y, z here span a machine coordinate system, which in some exemplary embodiments serves as a reference coordinate system for the measurement point coordinates.

The prior art discloses other designs for coordinate measuring machines, for example coordinate measuring machines of gantry or bridge design. The novel device and the novel method are not restricted to a specific design of the axes of movement, and so instead of the coordinate measuring machine 12 it is also possible to use a coordinate measuring machine in which the movement of the measuring head 16 relative to the workpiece receptacle 14 is realized in some other way. In principle, the movement of the measuring head 16 relative to the workpiece receptacle 14 can be restricted to fewer than three axes of movement or the measuring head 16 and/or the workpiece receptacle 14 could have further axes of movement, such as axes of rotation, for instance.

In this exemplary embodiment, the measuring head 16 has an optical sensor 20, by means of which a measured object (not illustrated here) can be measured in a non-contact manner. In some exemplary embodiments, the optical sensor 20 comprises a camera and a lens in order to record an image of the measured object. Furthermore, the coordinate measuring machine 12 in this exemplary embodiment also has a tactile sensor 22 with a star-shaped arrangement of styluses, which can be used to touch measurement points on a measured object in order to carry out a measurement.

The coordinate measuring machine 12 here exhibits one preferred exemplary embodiment of the novel device and of the novel method. In other exemplary embodiments, the device can comprise a different measuring head, for instance only a tactile measuring head or only an optical measuring head. In principle, the measuring head 16 could also comprise a capacitively measuring sensor or be for example a measuring head that operates according to the X-ray principle. In all preferred exemplary embodiments, the measuring head supplies measurement values representing the position of at least one measurement point on the measured object relative to a coordinate measuring system 24.

The coordinate measuring machine 12 has a control unit 26, with the aid of which the drives (not provided with a designation here) for the workpiece receptacle 14 and the measuring head 16 are driven in order to carry out a measurement. Furthermore, the control unit 26 takes up the measurement values of the measuring head 16 and makes them available to an evaluation unit 28 for further evaluation. In the illustrated exemplary embodiment, the evaluation unit 28 is a PC, on which configuration and evaluation software is executed, such as e.g. the CALYPSO software specified at the outset, the latter, however, having been extended by a few capabilities. The configuration and evaluation software makes it possible, on the one hand, to generate a measurement sequence for carrying out an automated measurement on a measured object according to the novel method. On the other hand, the evaluation software makes the quantified measurement results available to an operator in a suitable manner.

The evaluation unit 28 here includes an image display appliance 30, on which, inter alia, an image 32a of a measured object 32 (FIG. 2) can be displayed. In preferred exemplary embodiments, the image 32a is produced on the basis of CAD data of the measured object 32, with the CAD data being supplied to the evaluation unit 28 by way of a suitable interface 33, such as e.g. a USB interface or a network connector.

The device 10 comprises a memory with a first memory area, in which the demand data 34 for the measured object are stored. In some exemplary embodiments, the demand data may correspond to the CAD data. In this case, they contain tolerance specifications, which represent acceptable manufacturing tolerances, for the individual geometric elements of the measured object.

In a second memory area, individual machine properties 36 of the coordinate measuring machine 12 are stored. The individual machine properties 36 characterize at least the type of the coordinate measuring machine and of the employed sensors 20, 22. In some preferred exemplary embodiments, the individual machine properties 36 contain information items about a sensor storage (not depicted here), in which a plurality of sensors are provided. In the configuration of the measurement sequence, it is then possible to select the sensors that are available in the sensor storage. Likewise, it is possible to choose between the optical sensor 20 and the tactile sensor 22 when generating the measurement sequence.

In some exemplary embodiments, the individual machine properties 36 also comprise calibration data for the individual coordinate measuring machine 12 and the respective sensors 20, 22. These are also advantageously taken into account when generating and modifying the measurement sequence.

Numerical values 38 which represent actual dimensional properties of a reference measured object 39 are stored in a third memory area. The reference measured object 39 is preferably a "master piece" which, for example, was measured under laboratory conditions in a highly precise reference measuring machine. In some exemplary embodiments, the numerical values 38 obtained in the process serve to generate an optimized measurement sequence for the measurement with the coordinate measuring machine 12 by virtue of, in particular, selecting the movement parameters of the measuring head 16 relative to the measured object on the workpiece receptacle 14 in such a way that the respective deviations from the reference values 38 are minimized.

In some exemplary embodiments, the numerical values 38 are determined on a measured object 39 of the same type using a different type of coordinate measuring machine and/or using a different sensor. Taking into account the numerical values 38 when generating the modified second measurement sequence leads to good comparability of the measurement results.

In the preferred exemplary embodiments, an operator can generate a defined measurement sequence 40 for measuring a measured object 32 using the image on the image display appliance and transmit it to the control unit 26, which is indicated here by a data link 42. The measurement sequence 40 represents the plurality of control commands that cause the control unit 26 to move the measuring head 16 relative to the workpiece receptacle 14 and to record individual measurement values. With the aid of the measurement values, the evaluation unit 28 quantifies selected test features for the individual measured object.

Figure 2:
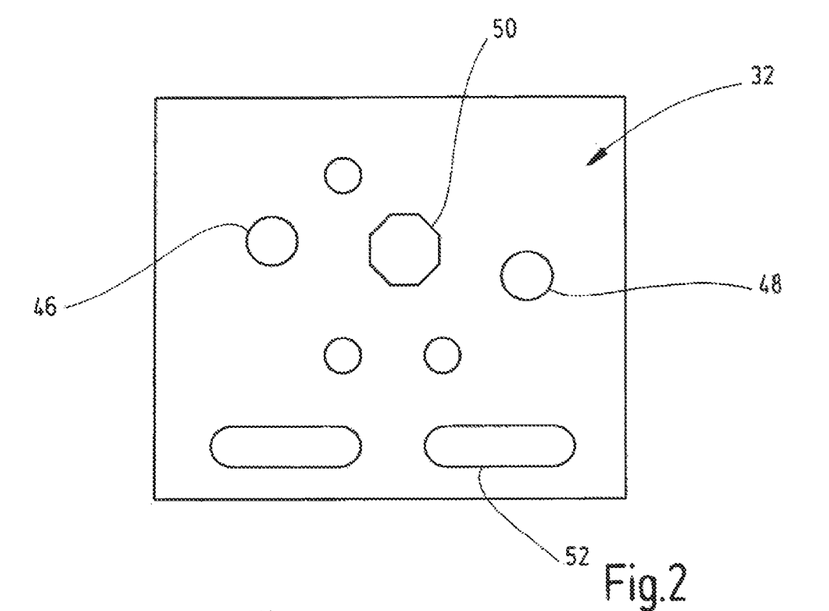
FIG. 2 shows an image of a measured object for explaining the novel method.

FIG. 2 shows the representation 32a of the measured object 32, which has a plurality of geometric elements. By way of example, some geometric elements are designated here by the reference numerals 46, 48, 50, 52. The geometric elements 46, 48 are cylindrical holes, for example, while the geometric element 50 is an octagonal pin that projects vertically from the observation plane. The geometric element 52 is for example an oval depression in the surface of the measured object, which is illustrated merely schematically and by way of example here.

The image 32a is displayed on the image display appliance 30. The operator of the device 10 can then select individual geometric elements in the manner described below in order to cause the measurement sequence 40 to be generated automatically with the aid of the evaluation unit 28.

Figure 3:
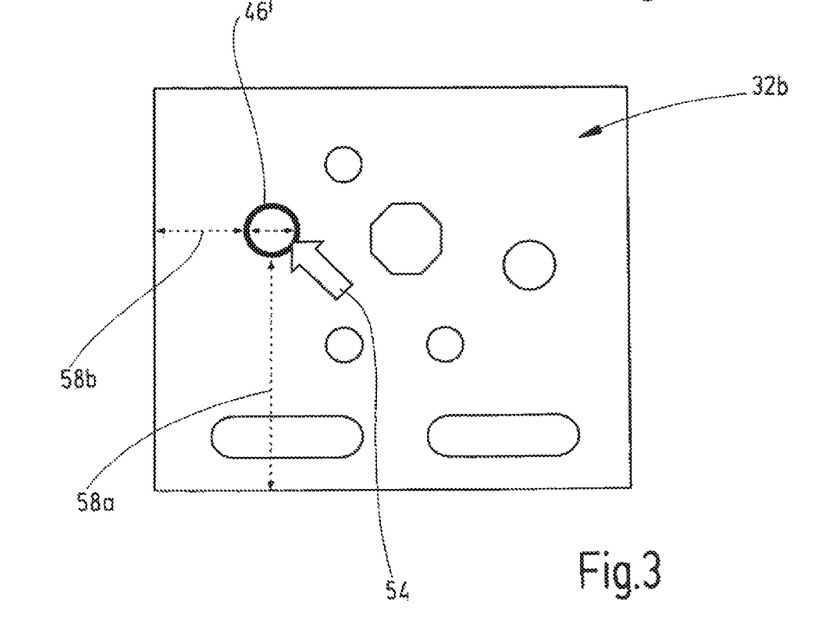
FIG. 3 shows the image of the measured object from FIG. 2, wherein a first geometric element is selected.

FIG. 3 shows an image 32b corresponding to the image 32a from FIG. 2. However, the operator has selected the geometric element 46 in the image 32b with the aid of a mouse pointer 54. In preferred exemplary embodiments, a selected geometric element is highlighted optically, as is illustrated on the basis of the geometric element 46' in FIG. 3. In some exemplary embodiments, the optical highlighting can be realized by a colored marking. Alternatively, or additionally, in some exemplary embodiments the operator can perform a selection via a touchscreen on which the representation 32 is displayed.

The user determines test features for a selected geometric element 46' for generating the measurement sequence. In some exemplary embodiments, the evaluation unit 28 therefore has the ability to detect edges in the image 32 of a measured object, in order to automatically identify geometric elements of the measured object. Subsequently, the evaluation unit 28 searches in a further database for predefined measurement elements whose shape corresponds to the identified geometric element. As soon as the evaluation unit 28 has identified a matching predefined measurement element, it selects the assigned typical test features on the basis of the database and displays them graphically in the image for the selected geometric element 46'. In the exemplary illustration in FIG. 3, the suitable test features are the diameter 56 of the hole and also the x- and y-positions 58a, 58b of the hole relative to the coordinate system 24.

Figure 4:
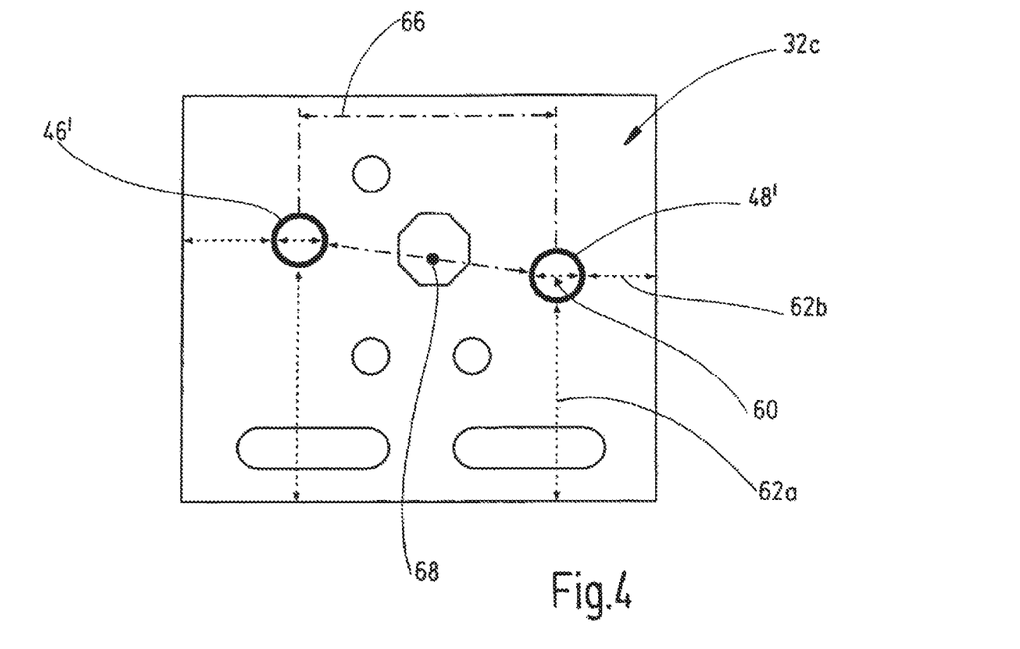
FIG. 4 shows the image of the measured object from FIG. 2 with two selected geometric elements.

FIG. 4 shows a further image 32c corresponding to the image 32b from FIG. 3, but after the operator has selected a further geometric element 48'. For the further selected geometric element 48', too, the evaluation unit 28 displays suitable test features 60, 62a and 62b in this case. Furthermore, in the preferred exemplary embodiments the evaluation unit 28 displays suitable linkage elements for the at least two selected geometric elements. In this exemplary embodiment, one suitable linkage element is the relative distance 64 between the two selected geometric elements 46', 48'. A further suitable linkage element here is for example the lateral offset 66 of the midpoints of the two selected geometric elements 46', 48'. A further linkage element may be the point 68 of symmetry between the two selected geometric elements 46', 48'. Generally, linkage elements are features of the object to be measured which represent a spatial relationship between two or more geometric elements on the measured object.

Figure 5:
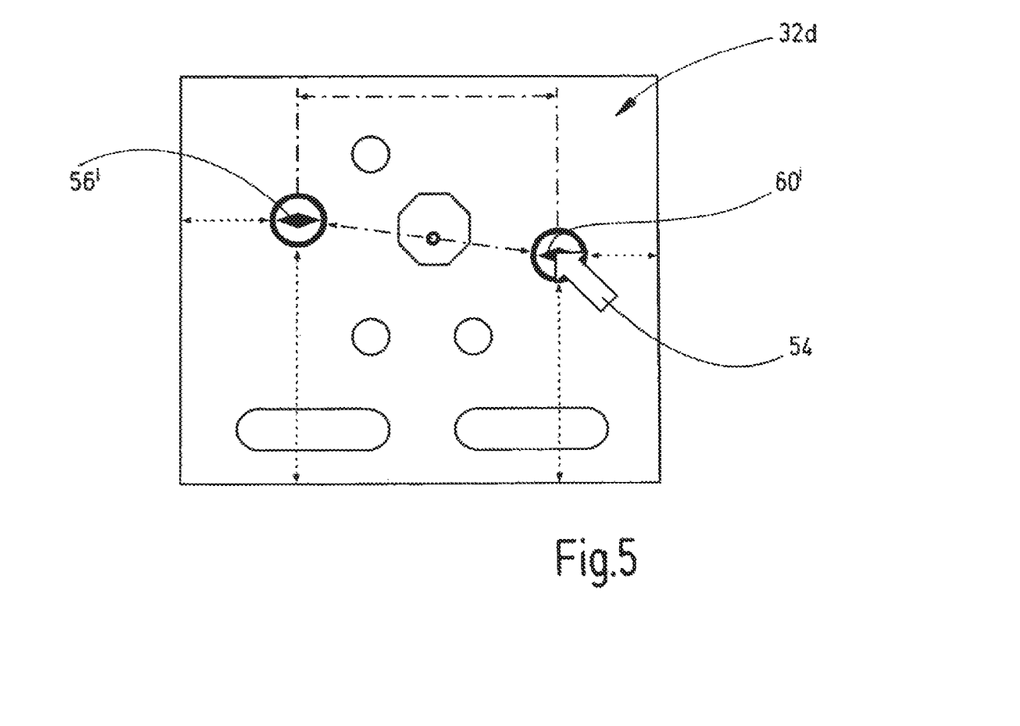
FIG. 5 shows the image of the measured object from FIG. 2 with a plurality of selected test features.

In the image in FIG. 4, two geometric elements 46', 48' of the measured object 32 are selected and the evaluation unit 28 offers suitable test features 56, 58, 60, 62 and linkage elements 64, 66, 68 with respect to the selected geometric elements 46', 48'. By contrast therewith, FIG. 5 shows an image 32d in which the operator has selected the test features 56' and 60' and the offered linkage element 68' with the aid of the mouse pointer 54. In the preferred exemplary embodiments, selected test features and linkage elements are highlighted, as is indicated schematically in FIG. 5. With the selection of a test feature and/or linkage element, the evaluation unit 28 adopts the selected test feature and/or linkage element into the measurement sequence 40. By means of multiple selection, the operator can thus configure an individual measurement sequence for a measured object.

In preferred exemplary embodiments, the measurement sequence 40 is generated after the conclusion of all selection steps automatically by the evaluation unit 28 by virtue of the fact that the evaluation unit 28 determines the control commands for the control unit 26 on the basis of the selected test features and/or linkage elements. Afterward, the evaluation unit 28 transmits the measurement sequence 40 to the control unit for recording the individual measurement values on the selected geometric elements of the measured object. The evaluation unit 28 reads in the recorded measurement values from the control unit 26 and determines numerical values for all selected test features and/or linkage elements depending on said measurement values, wherein each of said numerical values represents a dimensional property of the measured object that corresponds to the respective test feature and/or linkage element.

Figure 6:
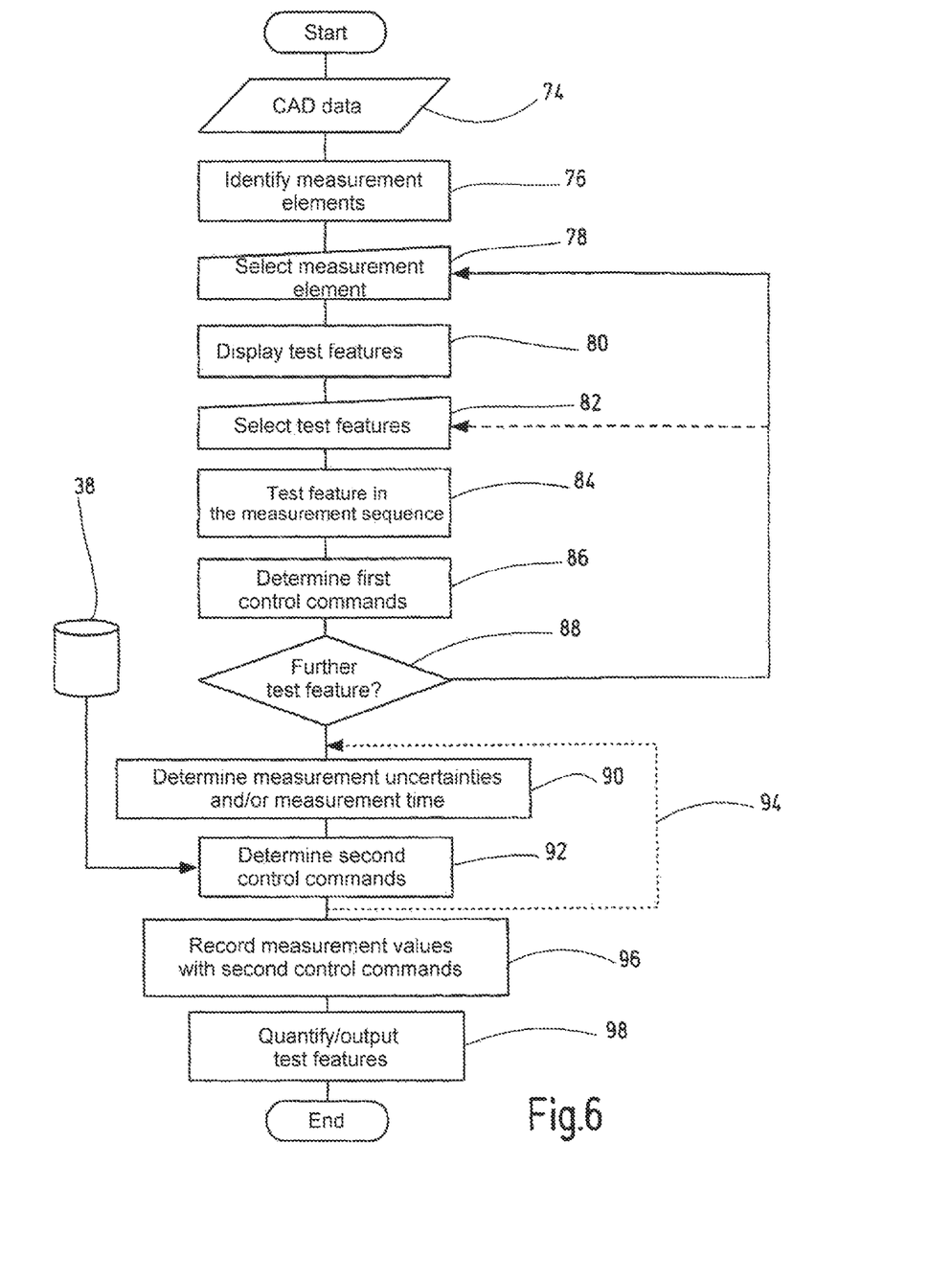
FIG. 6 shows a flow diagram for explaining an exemplary embodiment of the novel method.

In the exemplary embodiment according to FIG. 6, the CAD data of the object to be measured are provided in step 74, for example by virtue of the CAD data being loaded into the memory 34 via the interface 33. In accordance with step 76, geometric elements to be measured (measurement elements) are subsequently identified on the basis of the CAD data. In some exemplary embodiments, this is carried out by the user. In other exemplary embodiments, the evaluation unit 28 can be configured to automatically identify suitable measurement elements on the basis of the CAD data and offer these to the user for selection.

In accordance with step 78, the user selects a first geometric element to be measured (measurement element) for generating the measurement sequence. In preferred exemplary embodiments, the evaluation unit 28 displays suitable test features relating to the selected measurement element (step 80). In accordance with step 82, the user selects a desired test feature and the latter is adopted into the measurement sequence in accordance with step 84. With the adoption into the measurement sequence, the evaluation unit 28 determines first (provisional) control commands for controlling the measuring head 16 relative to the measured object on the workpiece receptacle 14. Subsequently, in accordance with step 88, a decision is taken as to whether further measurement elements and/or test features are intended to be selected.

In accordance with step 90, the measurement uncertainties are now determined for all selected test features, wherein use is preferably made of the Virtual CMM software tool from PTB. Alternatively, or additionally, it is possible to ascertain a measurement time on the basis of the first control commands, in particular using a computer-based simulation that uses the evaluation and control unit 26, 28. In some preferred exemplary embodiments, a difference is determined between the ascertained measurement time and a defined target time that is predetermined by the user and stored in the memory 38 of the evaluation unit 28.

In accordance with step 92, second control commands which are at least partly modified in relation to the first control commands from step 86 are determined depending on the obtained measurement uncertainties and/or the first measurement time and/or the difference. In the preferred exemplary embodiments, the second control commands lead to a modified movement behavior of the measuring head 16, in particular to a modified movement speed and/or trajectory, at at least some points of the automated measurement sequence. In some exemplary embodiments, the modified (second) control commands may contain a sensor change and/or a change of the probe system. In accordance with the loop 94, the determination of the measurement uncertainties and the determination of modified control commands can be repeated iteratively.

After completion of the iteration loops 94, the modified (second) measurement sequence is complete and can be transferred to the control unit 26 via the data link 42. In accordance with step 96, the control unit 26 records the measurement values on the basis of the second control commands and subsequently makes said measurement values available to the evaluation unit 28 for evaluation purposes. In accordance with step 98, the test features are quantified depending on the recorded measurement values and, for example, output on the image display appliance 30.

In some preferred exemplary embodiments, the evaluation unit 28 displays a restricted number of variation options to the user when generating the (modified) measurement sequence in order to bring the defined measurement uncertainty for a selected test feature to the desired value relative to the acceptable manufacturing tolerances. In some variants, the evaluation unit 28 respectively displays those variation options to the user, for example three in each case, which have the greatest effect on the measurement uncertainty. The user can then undertake the modification of the measurement sequence with the aid of the evaluation unit 28, for example by virtue of confirming modifications proposed by the evaluation unit 28. Particularly advantageously, albeit unusually, the novel method comprises determining modified second control commands for at least one geometric element that lead to an increase in the measurement uncertainty for the corresponding geometric element. This advantageously occurs in all geometric elements in which the acceptable manufacturing tolerances are particularly high in comparison with the acceptable manufacturing tolerances of other geometric elements and/or test features.

As a consequence, in the preferred exemplary embodiments, the novel method and the corresponding device include, overall, a computer-based optimization of a measurement sequence, wherein the obtainable measurement uncertainties are used as a decisive optimization criterion. Within the scope of the optimization, movement parameters for the movements of the measurement head relative to the workpiece receptacle for the measured object and/or properties of the employed sensor, in particular, are modified. Advantageously, the evaluation unit 28 contains a software tool for voice input such that the user can undertake and/or confirm the modifications via voice input.

What is claimed is:

1. A method for determining actual dimensional properties of a measured object having a plurality of geometric elements, the method comprising the following steps:
   providing a coordinate measuring machine having a measuring head for recording measurement values representing a position of at least one measurement point on the measured object;
   providing demand data representing demand properties for the plurality of geometric elements of the measured object, wherein the demand properties comprise acceptable manufacturing tolerances for the geometric elements;
   generating, in a computer-assisted manner, a measurement sequence including control commands that define movements of the measuring head relative to the measured object, wherein the measurement sequence defines measurement values to be recorded at defined measuring head positions relative to the measured object;
   recording individual measurement values on the measured object by controlling the measuring head based on the control commands; and
   determining numerical values based on the individual measurement values,
   wherein:
   the numerical values represent actual dimensional properties of the measured object that correspond to test features,
   generating the measurement sequence includes, prior to performing the recording:
      selecting defined geometric elements from the plurality of geometric elements;
      based on the demand data, determining the test features relating to the defined geometric elements;
      generating a first measurement sequence in a computer-assisted manner based on the test features, wherein the first measurement sequence defines first control commands;
      ascertaining defined measurement uncertainty for the test features based on the first control commands;
      modifying the first measurement sequence in a computer-assisted manner to generate a second measurement sequence with second control commands, wherein the second control commands at least partially differ from the first control commands; and
      setting the second control commands as the control commands for performing the recording,
   the modifying includes selecting the second control commands, in a computer-assisted manner, in such a way that:
      for each numerical value of the numerical values, a measurement uncertainty of the numerical value is smaller by a defined absolute value than a respective one of the acceptable manufacturing tolerances and
      with respect to the first control commands, the second control commands increase the defined measurement uncertainty for at least one of the test features while one of maintaining and reducing the defined measurement uncertainty for at least one other of the test features.

2. The method of claim 1, wherein the second control commands are selected in a computer-assisted manner in such a way that the numerical values each have a defined measurement uncertainty that is between 10% and 50% of the acceptable manufacturing tolerances.

3. The method of claim 1, wherein the second control commands are determined based on a plurality of iteration steps.

4. The method of claim 1, wherein the first control commands and second control commands each define movement parameters of the measuring head relative to the measured object.

5. The method of claim 1, wherein:
   a first database is provided, in which machine properties of the coordinate measuring machine are stored and
   the second control commands are determined depending on the machine properties.

6. The method of claim 5, wherein:
   a second database is provided, in which further numerical values that represent actual dimensional properties of a reference measured object are stored and
   the second control commands are determined depending on the further numerical values.

7. The method of claim 1, wherein the measuring head for recording the measurement values is equipped with a defined sensor arrangement that is determined depending on the defined measurement uncertainty.

8. The method of claim 1, wherein the second control commands are further selected in such a way that the second measurement sequence causes a defined measurement time.

9. The method of claim 1, wherein the second control commands are further selected depending on an individual user approval.

10. The method of claim 1, wherein at least one of the first measurement sequence and the second measurement sequence are generated with the aid of speech input.

11. The method of claim 1, wherein:
a database is provided, in which further numerical values that represent actual dimensional properties of a reference measured object are stored and
the second control commands are determined depending on the further numerical values.

12. A device for determining actual dimensional properties of a measured object having a plurality of geometric elements, the device comprising:
a workpiece receptacle for holding the measured object;
a measuring head that is displaceable relative to the workpiece receptacle and configured to record measurement values that represent a position of at least one measurement point on the measured object;
an evaluation and control unit that displaces the measuring head relative to the workpiece receptacle depending on a defined measurement sequence; and
an interface for supplying demand data that represent demand properties for the plurality of geometric elements of the measured object,
wherein:
the demand properties comprise acceptable manufacturing tolerances for the geometric elements,
the evaluation and control unit is configured to generate the defined measurement sequence,
the defined measurement sequence defines movements of the measuring head relative to the measured object and defines measurement values to be recorded at defined measuring head positions relative to the measured object,
the evaluation and control unit is configured to:
select defined geometric elements from the plurality of geometric elements based on the demand data;
determine test features relating to the defined geometric elements based on the demand data;
determine control commands for controlling the measuring head relative to the defined geometric elements based on the test features; and
control the measuring head depending on the control commands in order to record individual measurement values on the measured object and to determine first numerical values depending on the individual measurement values,
the first numerical values represent actual dimensional properties of the measured object,
the actual dimensional properties correspond to the test features,
the evaluation and control unit is further configured to, prior to commencing the defined measurement sequence and recording the individual measurement values:
generate a first measurement sequence that defines first control commands for controlling the measuring head relative to the measured object based on the test features;
ascertain defined measurement uncertainty based on the first control commands;
modify the first measurement sequence before recording the individual measurement values in order to obtain a second measurement sequence with second control commands, wherein the second control commands at least partly differ from the first control commands,
the evaluation and control unit is configured to use the second control commands according to the second measurement sequence to control the measuring head for recording the individual measurement values, and
the evaluation and control unit is configured to select the second control commands in such a way that:
the numerical values each have a defined measurement uncertainty that is smaller by a defined absolute value than the acceptable manufacturing tolerances for the geometric elements and
the defined measurement uncertainty for at least one of the test features is increased while the defined measurement uncertainty for at least one other test feature is one of maintained and reduced.

13. A method for determining actual dimensional properties of a measured object having a plurality of geometric elements, the method comprising the following steps:
providing a coordinate measuring machine having a measuring head for recording measurement values representing a position of at least one measurement point on the measured object;
providing demand data representing demand properties for the plurality of geometric elements of the measured object, wherein the demand properties comprise acceptable manufacturing tolerances for the geometric elements;
generating, in a computer-assisted manner, a measurement sequence that defines movements of the measuring head relative to the measured object and that defines measurement values to be recorded at defined measuring head positions relative to the measured object;
controlling the measuring head based on control commands and recording individual measurement values on the measured object; and
determining numerical values based on the individual measurement values,
wherein:
the numerical values represent actual dimensional properties of the measured object that correspond to a plurality of test features,
generating the measurement sequence includes, prior to performing the controlling:
selecting defined geometric elements from the plurality of geometric elements;
based on the demand data, determining the plurality of test features relating to the defined geometric elements;
generating a first measurement sequence that defines first control commands;
determining defined measurement uncertainty according to the first control commands; and
modifying the first measurement sequence in order to obtain a second measurement sequence with second control commands, wherein the second control commands at least partially differ from the first control commands, the second control commands are used for controlling the measuring head for recording the individual measurement, and the modifying includes selecting the second control commands in such a way that:

the numerical values each have a defined measurement uncertainty that is smaller by a defined absolute value than the acceptable manufacturing tolerances for the geometric elements and respective individual measurement uncertainties are obtained for the plurality of test features.

14. The method of claim 13, wherein:

the defined measurement uncertainty is ascertained depending on the first control commands and the first measurement sequence is modified depending on the ascertained measurement uncertainty.

15. The method of claim 13, wherein the second control commands are selected in such a way that the defined measurement uncertainty is increased for at least one of the plurality of test features.

16. The method of claim 13, wherein the second control commands are determined after the first measurement sequence was fully completed.

17. A non-transitory storage medium encoded with a computer program that, when executed by a computer processor, causes a computer to perform the following steps:

obtaining demand data representing demand properties for a plurality of geometric elements of a measured object, wherein the demand properties comprise acceptable manufacturing tolerances for the geometric elements;

generating, in a computer-assisted manner, a measurement sequence that defines movements of a measuring head of a coordinate measuring machine relative to the measured object and that defines measurement values to be recorded at defined measuring head positions relative to the measured object;

recording individual measurement values on the measured object by controlling the measuring head depending on control commands of the measurement sequence; and determining numerical values depending on the individual measurement values, wherein:

the numerical values represent actual dimensional properties of the measured object that correspond to test features, the generating includes, prior to the recording, selecting defined geometric elements from the plurality of geometric elements;

determining the test features relating to the defined geometric elements based on the demand data;

based on the test features, generating a first measurement sequence that defines first control commands;

ascertaining defined measurement uncertainty is ascertained depending on the first control commands; and modifying the first measurement sequence based on the ascertained measurement uncertainty in order to obtain a second measurement sequence with second control commands, wherein the second control commands at least partially differ from the first control commands, the control commands for recording the individual measurement values are the second control commands, and the modifying includes selecting the second control commands in such a way that:

the numerical values each have a defined measurement uncertainty that is smaller by a defined absolute value than the acceptable manufacturing tolerances for the geometric elements and the defined measurement uncertainty is increased for at least one of the test features while the defined measurement uncertainty for at least one other test feature is one of maintained and reduced.

* * * * *